(12) United States Patent
Nyhan et al.

(10) Patent No.: US 10,497,007 B2
(45) Date of Patent: Dec. 3, 2019

(54) METHOD AND SYSTEM FOR CONDUCTING AN ON-LINE SURVEY

(75) Inventors: Nick Nyhan, New York, NY (US); Ronit Aviv, Holmdel, NJ (US)

(73) Assignee: Kantar LLC, New York, NY (US)

( * ) Notice: Subject to any disclaimer, the term of this patent is extended or adjusted under 35 U.S.C. 154(b) by 3627 days.

(21) Appl. No.: 09/900,674

(22) Filed: Jul. 6, 2001

(65) Prior Publication Data

US 2003/0009372 A1    Jan. 9, 2003

(51) Int. Cl.
*G06Q 30/02*    (2012.01)

(52) U.S. Cl.
CPC ......... *G06Q 30/02* (2013.01); *G06Q 30/0203* (2013.01)

(58) Field of Classification Search
CPC ............................ G06Q 30/02; G06Q 30/0203
USPC .......................................................... 705/10
See application file for complete search history.

(56) References Cited

U.S. PATENT DOCUMENTS

| | | |
|---|---|---|
| 5,724,521 A | 3/1998 | Dedrick |
| 5,794,210 A | 8/1998 | Goldhaber et al. |
| 5,838,790 A | 11/1998 | McAuliffe et al. |
| 5,848,397 A | 12/1998 | Marsh et al. |
| 5,918,014 A | 6/1999 | Robinson |
| 5,948,061 A | 9/1999 | Merriman et al. |
| 6,006,197 A | 12/1999 | d'Eon et al. |
| 6,009,410 A | 12/1999 | LeMole et al. |
| 6,070,145 A | 5/2000 | Pinsley et al. |
| 6,138,155 A | 10/2000 | Davis et al. |
| 6,199,106 B1 | 3/2001 | Shaw et al. |
| 6,477,504 B1 * | 11/2002 | Hamlin et al. .................. 705/10 |
| 6,728,755 B1 * | 4/2004 | de Ment ....................... 709/203 |
| 6,807,532 B1 * | 10/2004 | Kolls .............................. 705/10 |
| 6,826,540 B1 * | 11/2004 | Plantec et al. ................. 705/10 |
| 6,839,680 B1 * | 1/2005 | Liu et al. ........................ 705/10 |
| 6,868,389 B1 * | 3/2005 | Wilkins et al. ................ 705/10 |
| 6,901,424 B1 * | 5/2005 | Winn ............................. 709/201 |
| 6,993,495 B2 * | 1/2006 | Smith et al. .................... 705/10 |

(Continued)

FOREIGN PATENT DOCUMENTS

| | | |
|---|---|---|
| WO | WO 97/22074 A1 | 6/1997 |
| WO | WO 97/40514 A1 | 10/1997 |
| WO | WO 01/33831 A2 | 5/2001 |

OTHER PUBLICATIONS

"Dynamic Logic: An Online Research Company", www.dynamiclogic. com, Mar. 3, 2000 [retrieved Aug. 3, 2005], 16 pages, retrieved from: Google.com and archive.org.*

(Continued)

*Primary Examiner* — Andre D Boyce
(74) *Attorney, Agent, or Firm* — Leydig, Voit & Mayer, Ltd.

(57) ABSTRACT

A method and system for conducting an on-line survey involves communicating with a computer over a computer network and obtaining such information as whether a solicitation for the survey has previously been displayed on the computer, how long ago it was displayed, and whether a user at the computer ever attempted to take the survey. Based on this information, a decision is made as to whether to transmit a solicitation for the survey to the computer. The invention helps ensure that users are not subjected to the annoyance of repeatedly and frequently being asked to take a particular on-line survey.

16 Claims, 5 Drawing Sheets

(56) References Cited

U.S. PATENT DOCUMENTS

| | | | |
|---|---|---|---|
| 7,010,497 B1* | 3/2006 | Nyhan et al. | 705/14 |
| 2002/0016731 A1* | 2/2002 | Kupersmit | 705/10 |
| 2002/0059114 A1* | 5/2002 | Cockrill et al. | 705/27 |
| 2002/0128898 A1* | 9/2002 | Smith et al. | 705/10 |
| 2002/0143630 A1* | 10/2002 | Steinman et al. | 705/14 |
| 2002/0147776 A1* | 10/2002 | Lippiner et al. | 709/204 |
| 2004/0193479 A1* | 9/2004 | Hamlin et al. | 705/10 |
| 2005/0071219 A1* | 3/2005 | Kahlert et al. | 705/10 |

OTHER PUBLICATIONS

Melillo, Wendy, "Getting Personal", ADWEEK Eastern Addition, Mar. 27, 2000 [retrieved Aug. 3, 2005], vol. 41, No. 13, pp. 1-4, retrieved from: Dialog, file 16.*

"24/7 Media Partners Exclusively with Dynamic Logic", Business Wire, Aug. 19, 1999 [retrieved Aug. 3, 2005], pp. 1-3, retrieved from: Dialog, file 610.*

"Comet Systems Introduces Cometized Banner", Business Wire, Nov. 1, 1999 [retrieved Aug. 3, 2005], pp. 1-2, retrieved from: Dialog, file 16.*

Ipsos-ASI The Advertising Research Company, *Vendor Background*; Apr. 5, 2000; pp. 1-30.

*New Service Rewards Users for Viewing Web Ads*, Gale Group Newsletter DB: Jun. 18, 1996.

* cited by examiner

METHOD AND SYSTEM FOR CONDUCTING AN ON-LINE SURVEY

TECHNICAL FIELD

The invention relates generally to on-line advertising and, more particularly, to soliciting computer users to take on-line surveys.

BACKGROUND

Businesses have increasingly discovered that the internet can be an effective forum for increasing brand awareness. To accomplish this goal, businesses frequently place advertisements on web pages that they believe will be viewed by potential customers. These advertisements can take a variety of forms, including banner ads. A banner ad is a graphic image that advertises a product or service. A banner ad typically contains a link, so that when a user clicks on the ad, the link is activated and he or she is sent to another web page having further information about the product or service being advertised. A banner ad can be displayed within the boundaries of a web page itself, or in a window, commonly referred to as a pop-up window, that is separate from the window in which the user's browser runs window. A problem with popup windows is that they are sometimes seen as intrusive, and users often close them as soon as they appear.

Businesses have also discovered that, in addition to being a good advertising forum, the internet also provides a convenient way to survey consumers in order to determine what impact internet advertising is having on them. Recruiting users to take surveys can be a challenging task. U.S. Pat. No. 6,070,145, entitled "RESPONDENT SELECTION METHOD FOR NETWORK-BASED SURVEY" proposes a method in which visitors to a web site are randomly chosen to be solicited to take an on-line survey. If a visitor is chosen, then a graphic image soliciting the visitor to take the survey is transmitted from a surveyor to the web site being visited. The image is then displayed to the visitor. If the visitor is not chosen, then a dummy image is displayed.

Another survey method is described in U.S. Pat. No. 7,010,497, entitled "SYSTEM AND METHOD FOR EVALUATING AND/OR MONITORING EFFECTIVENESS OF ON-LINE ADVERTISING." The method described therein involves determining whether a user has been exposed to an on-line ad such as by checking cookies stored on the user's computer. Based, at least in part, on this determination, a decision is made as to whether or not to solicit the user to take an on-line survey.

Collecting data through the use of on-line surveys provides a fast and effective way to determine how well an internet advertisement is being received. A problem with on-line surveys, however, is that users can get annoyed if they are repeatedly solicited to participate in them. This is particularly true if solicitations take the form of pop-up windows.

SUMMARY

In accordance with the foregoing, a method and system for conducting an on-line survey is provided. The invention keeps users from repeatedly being solicited to take a particular on-line survey by identifying which users have recently been solicited to take the survey, and refraining from soliciting those users. One embodiment of the invention involves receiving, from the user's computer, a request for a block of data, such as a web page, that includes an on-line advertisement, and determining whether or not the user has been previously solicited to take the on-line survey. If the user has not been previously solicited, then the requested block of data is modified prior to being sent to the user's computer. According to the modification, code for invoking a solicitation routine is inserted into the on-line advertisement.

Another embodiment of the invention involves receiving a request for a web page from a client computer, transmitting the requested web page to the client computer over the computer network, and transmitting an advertisement to the computer to be displayed along with the web page. The code for the advertisement includes a reference to a decision routine. The decision routine is invoked to determine whether the client computer has previously received a solicitation to take part in an on-line survey. A determination as to whether to transmit the solicitation to the computer is made based on the results of the decision routine.

Yet another embodiment of the invention is a system that includes a web server in communication with a client computer, and a survey logic server in communication with the client computer. The survey logic server is contacted when the client computer or the web server requests an on-line advertisement. In response to the request, the survey logic server performs the steps of: (1) determining whether a solicitation for an on-line survey has been recently sent to the client computer, and (2) transmitting a solicitation for an on-line survey to the client computer if it is determined that the solicitation has not been recently sent to the client computer.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF EMBODIMENTS OF THE INVENTION

The invention is generally directed to a method and system for conducting an on-line survey. An embodiment of the invention communicates with a computer over a computer network and obtains cookie data from the computer to determine: whether a solicitation for the survey has previously been displayed on the computer, how long ago it was displayed, and whether a user at the computer ever attempted to take the survey. Based on this information, a decision is made whether to transmit a solicitation to take the survey to the computer. The invention helps control the frequency and/or number of solicitations made and thus facilitate ensuring that users are not subjected to repeated and frequent requests to take a particular on-line survey.

Figure 1:
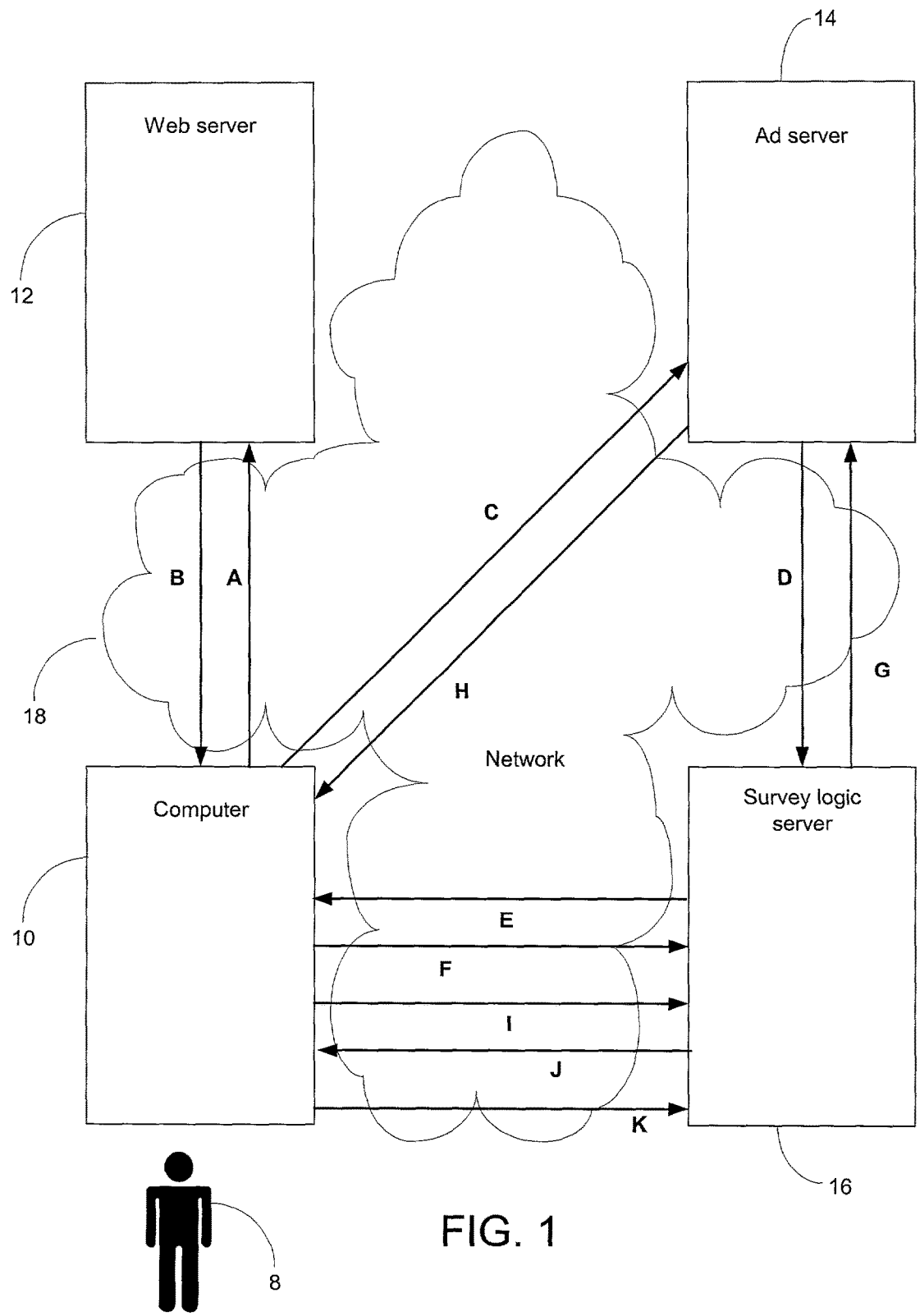
FIG. 1 is a block diagram generally illustrating an example network environment in which an embodiment of the invention is used.

An example of a network environment in which an embodiment of the invention is implemented is shown in FIG. 1. The network environment includes a computer 10 associated with a user 8, a web server 12 for delivering web pages, an ad server 14 for delivering on-line advertisement, and a survey logic server 16 for determining if and when to solicit users to take on-line surveys. Each of the components 10, 12, 14 and 16 is communicatively linked to a computer network 18. The components 10, 12, 14 and 16 send computer-readable instructions to one another, including source code that is interpreted by various program. Types of source code that are sent among the components 10, 12, 14 and 16 include, but are not limited to: script, such as JavaScript, and mark-up language code, such as Hypertext Mark-up Language (HTML) and Extensible Mark-up Language (XML). The term "code" is used herein to connote both executable and source code.

Example implementations of the computer network 18 include a public network, such as the internet, a private network, such as a virtual private network, or a combination thereof. In various embodiments of the invention, the computer network 18 is made up of scores of smaller networks many of which act as intermediate points in the communication among the components, 10, 12, 14 and 16. More detail concerning an implementation of the components 10, 12, 14 and 16 will be given following an overview of how an embodiment of the invention operates.

Referring again to FIG. 1, the basic operation of an example embodiment of the invention will now be described. The arrows A-K each represent the transmission of data between one or more of the components 10, 12, 14 and 16 over the network 18. The example operation starts when the user 8 operates the computer 10, logs onto the network 18 and requests a web page from the web server 12 (arrow A). The web server 12 sends the web page in the form of a mark-up language document, such as an HTML document, to the computer 10 (arrow B). In this example, the web page sent by the web server 12 is configured to display an on-line advertisement, such as a banner ad. The mark-up language document sent by the web server 12 to the computer 10 at arrow B includes a reference, such as an HTML "HREF," to data maintained by the ad server 14. The data includes computer-readable instructions for displaying the advertisement. Possible formats for the data include an image file, a script language file, or some combination thereof.

When the computer 10 reads the mark-up language document received from the web server 12, it interprets the above-mentioned reference and sends a request for the data to the ad server 14 (arrow C). The ad server 14 then contacts the survey logic server 16 to request that the survey logic server 16 determine whether to consider soliciting the user 8 to take an on-line survey (arrow D). In making the request, the ad server 14 passes the IP address of the computer 10 to the survey logic server 16. The survey logic server 16 contacts the computer 10 to request that the computer 10 send cookie data, if there is any, regarding previous on-line survey solicitations (arrow E). The cookie data includes those pieces of information that are stored in cookie files by the computer 10. The computer 10 responds to the request by sending the cookie data, if it exists, or by sending a negative reply it has no such cookie data (arrow F).

The survey logic server 16 analyzes the response received from the computer 10 to determine whether the user 8 has recently been solicited, if at all, to take the on-line survey. If the response indicates that the user 8 has been recently solicited, the procedure ends. If the response indicates that the user 8 has not been previously solicited (e.g. no cookie data was returned), or if the response indicates that there has been a sufficient amount of time since the last solicitation (e.g. the cookie data has a timestamp that is more than one hour old), then survey logic server 16 sends a script to the ad server 14 (arrow G). This script contains instructions for calling a decision routine on the survey logic server 16. The ad server 14 combines the script with the advertisement data that was requested by the computer 10 at arrow C and sends the combined data to the computer 10 (arrow H). In one implementation, the advertisement data is, itself, a script, which the ad server 14 modifies to include the script provided by the survey logic server 16. When the computer 10 receives the combined data from the ad server 14, it displays the advertisement and runs the script provided by the survey logic server 16. In accordance with the instructions contained in the additional script, the computer 10 generates a random number, and makes a call to the survey logic server 16 (arrow I). This call includes the random number as part of the Uniform Resource Locator (URL) to which the call is directed. The random number acts as an input to the decision routine executed at the survey logic server 16.

The survey logic server 16 then references a frequency parameter to determine whether or not to solicit the user 8 to take the on-line survey. The value of the frequency parameter expresses the probability that any given user will be solicited to take the on-line survey. The value is obtained by an algorithm or a look-up table and is expressed as a number that connotes a range. For example, a frequency of 20% connotes a range between 0 and 20 on a 100 point scale and indicates that any given user will have a 20% chance of being solicited to take the on-line survey. The survey logic server 16 compares the random number with the range. If the random number falls outside of the range, then the user 8 is not solicited. For example, if the value of the frequency parameter is 20% and the random number is 30 (i.e. outside of the range of numbers from 0 to 20), then the survey logic server returns a blank space to the computer 10. If the random number falls within the range, then the survey logic server 16 transmits script for soliciting the user 8 to the computer 10 (arrow J). The computer 10 then executes the script to run a solicitation procedure. Example implementations for the solicitation procedure include displaying a pop-up window to the user 8 requesting that the user click on a link to a web page that has the on-line survey. If the user clicks on the link, the computer 10 requests the web page from the survey logic server 16 (arrow K).

Although FIG. 1 and the accompanying description show an example of the flow of information that occurs in an embodiment of the invention, there are many other possible routes for sending the information. According to one implementation, the computer 10 requests the advertisement data from the web server 12 instead of directly from the ad server 14 (see arrow C). The web server 12 then relays the request to the ad server 14. In another implementation, the survey logic server 16 communicates with the computer 10 indirectly through the ad server 14 and/or the web server 12. In yet another implementation, the computer 10 has no knowledge that the advertisement data is being provided by a third party, and simply requests a web page from the web server 12, which pulls the advertisement data from the ad server 14 and inserts it into the web page before or during delivery of the web page to the computer 10. In still another implementation, the web server 12 and the ad server 14 are co-located as part of a single local area network.

Figure 2:
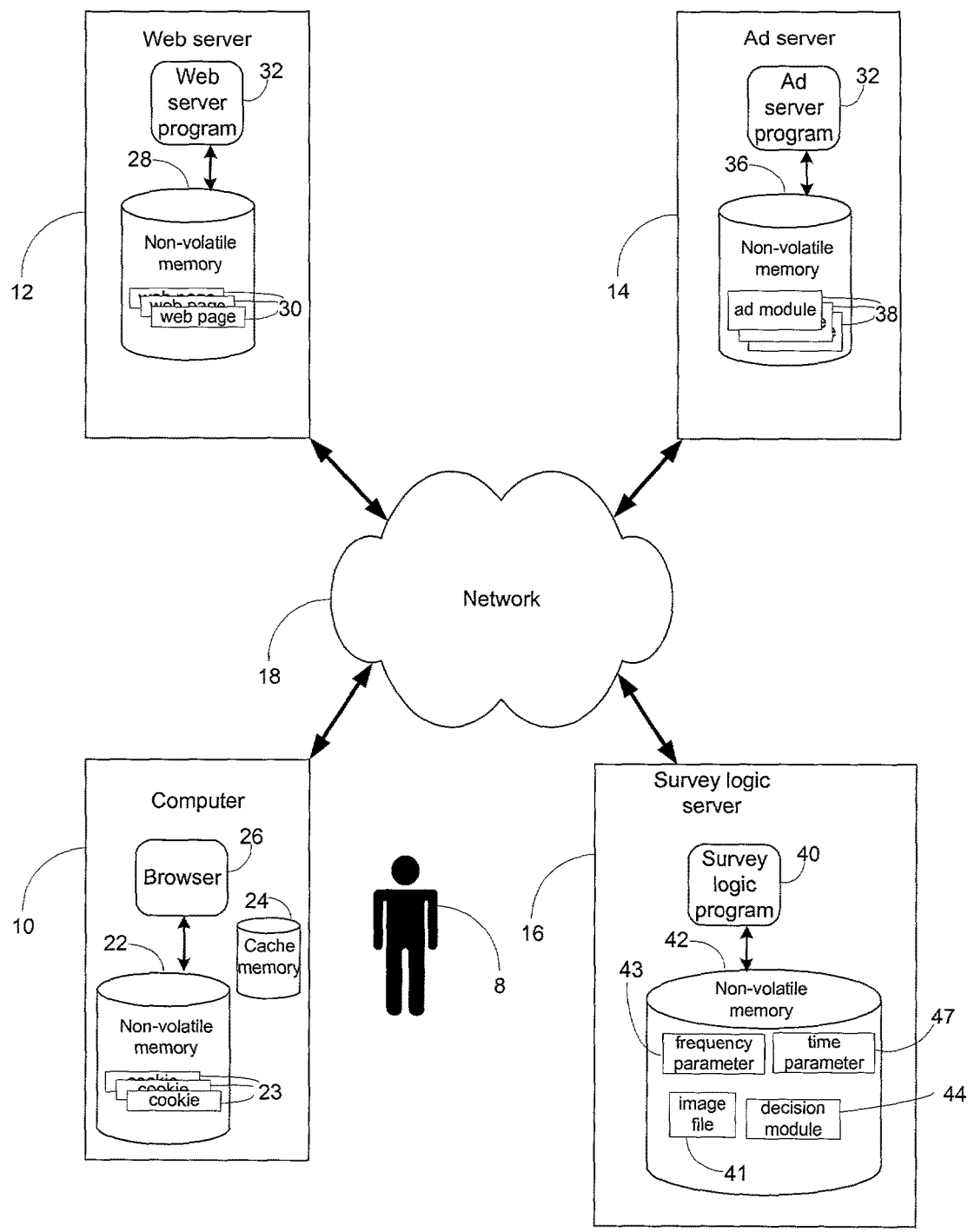
FIG. 2 is a block diagram that shows a more specific embodiment of the components of FIG. 1.

Referring to FIG. 2, a more specific implementation of the components 10, 12, 14 and 16 from FIG. 1 will now be described. The computer 10 includes a non-volatile memory 22 and a cache memory 24. The cache memory 24 temporarily stores data for quick access. The non-volatile memory 22 has stored therein history files or cookies 23 containing data representing, for example, what web sites the user 8 has visited or what data he/she has submitted at those webs sites using the computer 10. The computer 10 executes a browser program 26 for downloading and reading documents from the network 18, such as documents written in Hypertext Mark-up Language (HTML) and Extensible Mark-up Language (XML). The browser 26 also downloads and runs various scripts from the network 18, such as those written in JavaScript.

The web server 12 has a non-volatile memory 28 having stored therein web pages 30. Each web page 30 is a document written in a language such as HTML or XML that may include one or more scripts as well. The web server 12 executes a web server program 32 for delivering web pages to computers that request them over the network 18. The ad server 36 includes a non-volatile memory 36 having stored therein ad modules 38. Each ad module 38 contains code for displaying an on-line advertisement, such as a banner ad. The ad modules 38 include routines written in one or more languages that are understandable by various browsers, such as JavaScript or compiled Java applet. The ad server 14 executes an ad server program 34, which transmits one or more of the ad modules 38 over the network 18 to computers that request them.

According to an embodiment of the invention, at least some of the ad modules 38 further include code for calling functions of the survey logic server 16. To obtain the services of the survey logic server 16, for example, the administrators of the ad server 14 go to a web site associated with the survey logic server 16, copy the appropriate source code (e.g. HTML code or JavaScript) for invoking functions of the survey logic server 16, and paste the source code into the ad modules 38 for which on-line surveys are desired.

The survey logic server 16 includes a non-volatile memory 42 having stored therein a survey decision module 44. The survey decision module 44 includes code for deciding whether or not to solicit a computer user to take an on-line survey. Example implementations of the survey decision module 44 include a block of server-side script, such as CGI or PHP. The survey logic server 16 executes a survey logic program 40. The survey logic program 40 communicates with computers over the network 18 to conduct on-line surveys. The non-volatile memory 42 also has stored therein an image file 41 containing a dummy image.

Also stored in the non-volatile memory 42 are a frequency parameter 43 and a time parameter 47. The frequency parameter 43 dictates how often users are to be solicited for an on-line survey. For example, if F=0.2, then 20 out of every 100 users will be solicited. The time parameter 47, on the other hand, dictates how often users are allowed to be solicited for on-line surveys. For example, if the time parameter is equal to one hour, then a user won't be solicited for an on-line survey more often than once per hour.

According to an embodiment of the invention, the level of the frequency parameter can be changed throughout a survey campaign. In one embodiment, the frequency parameter 43 is set low at the beginning of the campaign and increased towards 1.0 near the end of the campaign. This allows the creators of the survey to get a few data points at the beginning of the campaign and, if necessary, change the questions. In one implementation, the value of the frequency parameter changes according to an algorithm that takes into account factors such as how many users have been surveyed, and how much time has elapsed in the survey campaign. In another implementation, the frequency parameter changes according to a look-up table correlating values of time elapsed in a campaign with values for the frequency.

Figure 3:
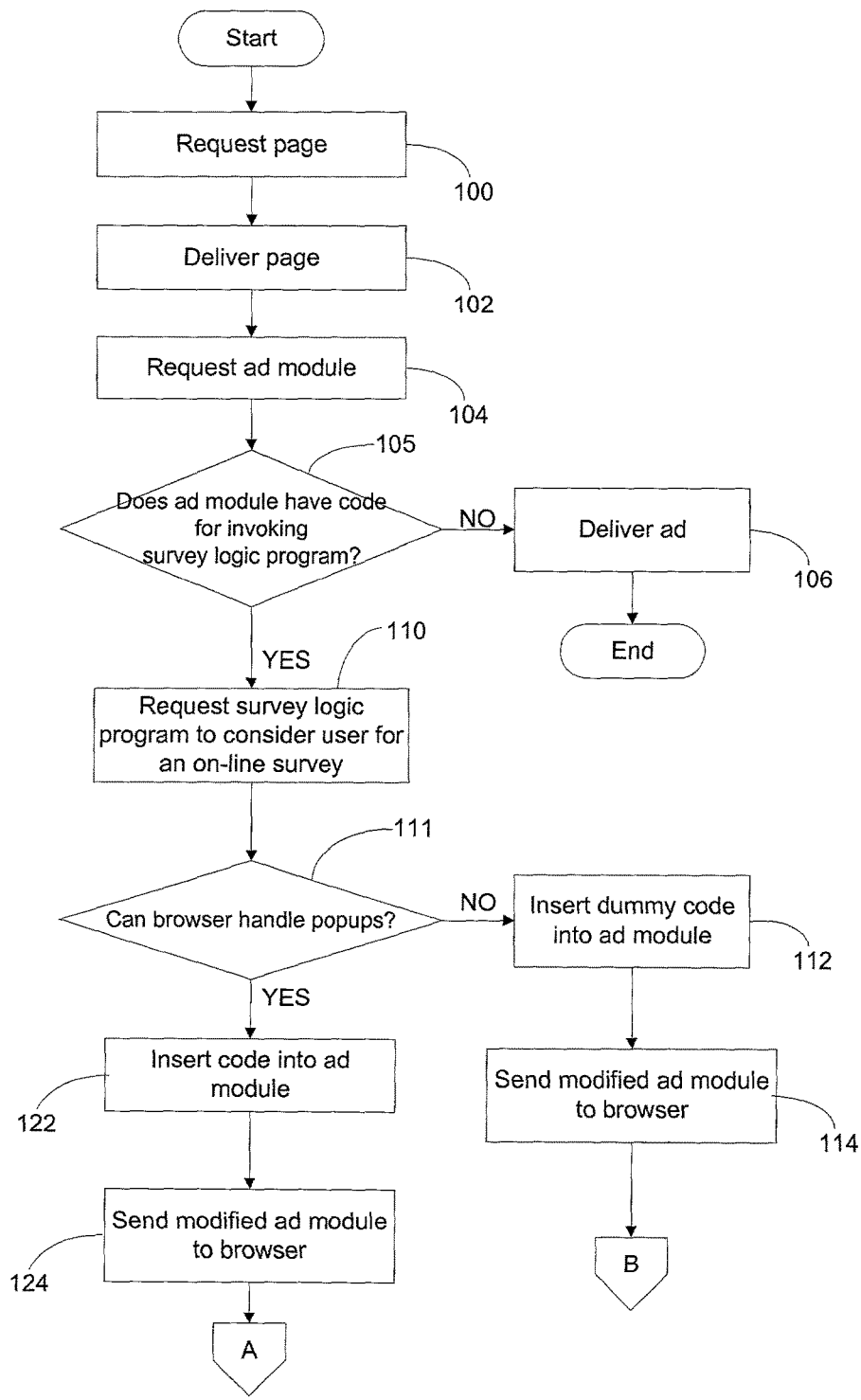
FIGS. 3-5 are a flowchart illustrating steps taken according to an embodiment of the invention.
Figure 4:
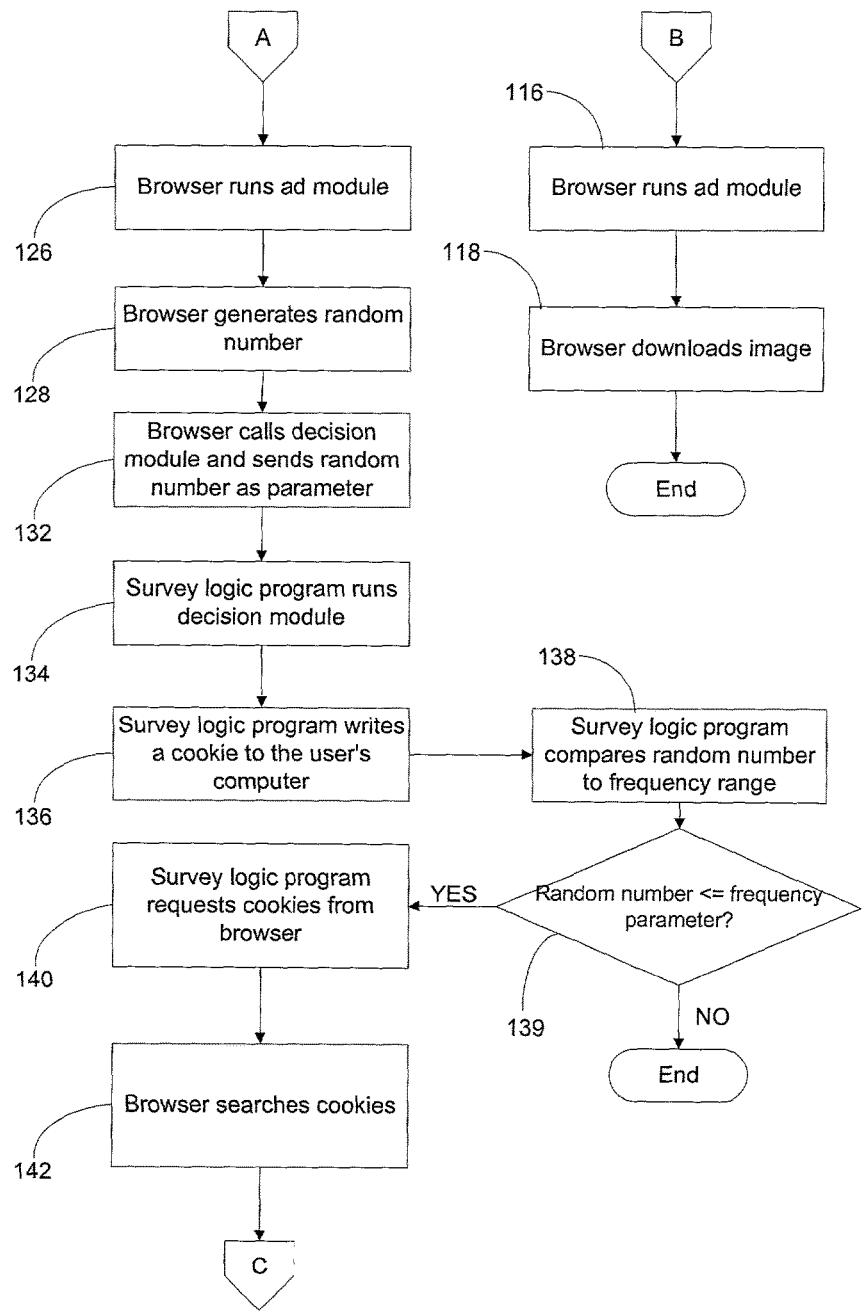
Figure 5:
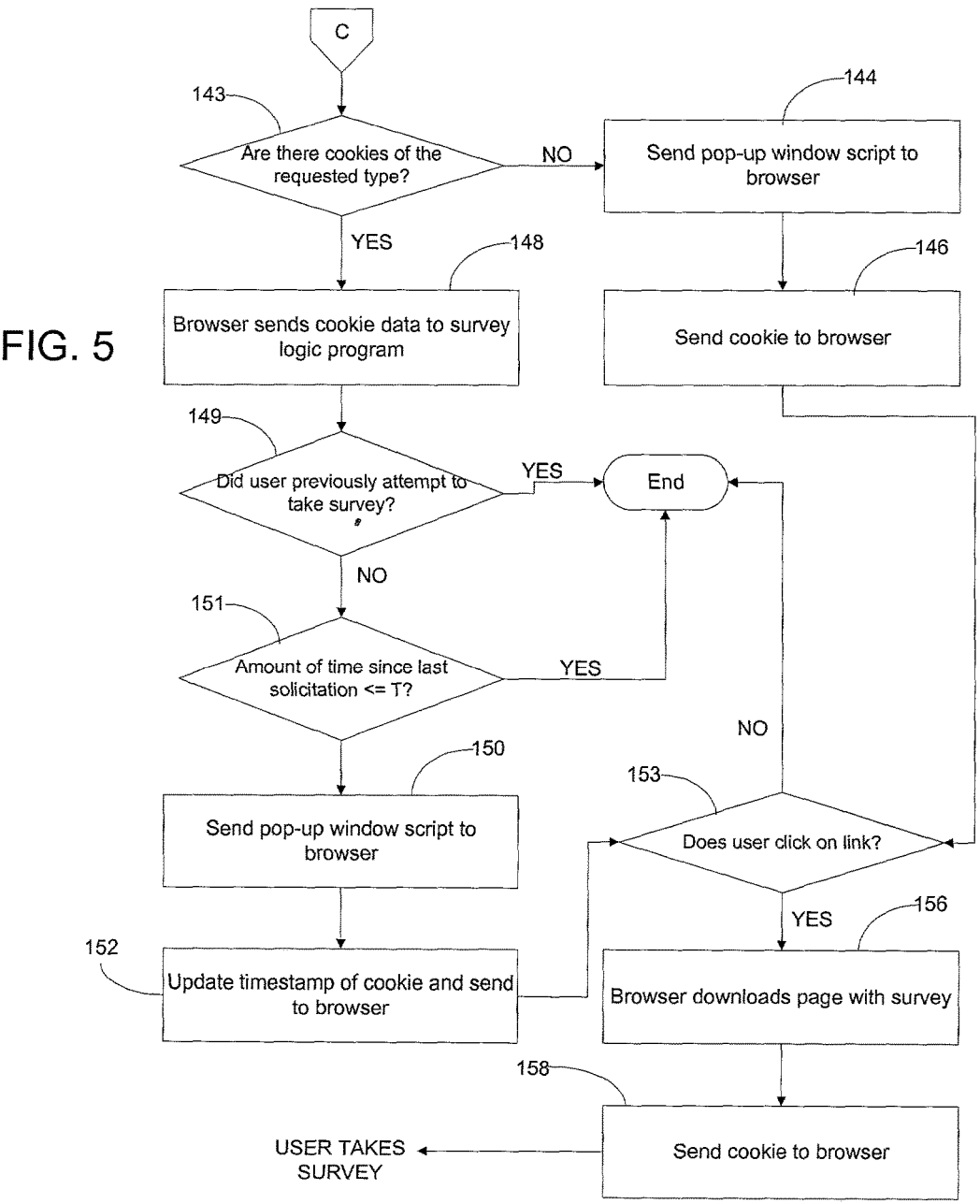

Referring to FIG. 2 as well as to the flowchart of FIGS. 3-5, an example of how an embodiment of the invention conducts on-line survey will now be described. At step 100, the process starts when the user 8 requests a web page from the web server program 32 using the browser 26. During step 102, the web server program 32 delivers the requested web page as an HTML document to the browser 26. While processing the HTML document, the browser 26 encounters a reference to one of the ad modules 38. Next, during step 104, the browser program 26 requests the referenced ad modules 38 from the ad server program 34. At step 105, if the requested ad module does not include code for invoking the survey logic program 40, then control passes to step 106, wherein the ad server program 34 treats the requested ad module 38 conventionally, and delivers it to the browser program 26 without modification, and the process ends. If the requested ad module does include the code, then control passes from step 105 to step 110, wherein the ad server program 34 transmits a request to have the user 8 be considered for an on-line survey to the survey logic program 40. This request includes Hypertext Transfer Protocol (HTTP) header information that was generated by the computer 10 and relayed by the ad server program 34. From this relayed header information, the survey logic program 40 obtains the IP address of the computer 10 and the browser type of the browser 26.

The survey logic program 40 responds by using the browser type information to determine whether the browser 26 can handle pop-up windows. At step 111, if the browser 26 can handle pop-up windows, then control passes to step 122. If not, then the control passes to step 112. In either case, the survey logic program 40 sends HTML source code to the ad server program 34. The ad server program inserts this additional HTML source code into the ad module requested by the browser 26. The content of the additional source code depends on whether the survey logic program 40 determines that the browser 26 can handle pop-up windows. If, at step 111, the browser 26 cannot handle pop-up windows, then control passes to step 112, wherein the survey logic program 40 sends dummy HTML code to the ad server program 34, such as a reference to a dummy image file, which the ad server program 34 inserts into the requested ad module. Next, at step 114, the ad server program 34 sends the modified ad module to the browser 26. At steps 116 and 118, depicted in FIG. 4, the browser 26 runs the modified ad module and downloads the dummy image file 41 (a 1×1 GIF, for example). The procedure then ends.

If, at step 111, the browser 26 can handle a popup, then control passes to step 122, wherein the survey logic program 40 sends to the ad server program source code for: (a) generating a random number, (b) passing the random number to the survey logic program 40, and (c) invoking the decision script 44, and wherein the ad server program 34 inserts the source code into the requested ad module. Control then passes to step 124, wherein the ad server program 34 sends the modified ad module to the browser 26. At step 126, the browser 26 runs the modified ad code. At step 128 the browser 26 generates the random number. At step 132, the browser sends the random number to the survey logic program 44 as part of a call to the decision module 44.

In an embodiment of the invention, the browser 26 includes the random number as part of the URL when making subsequent calls to the survey logic program 40. This helps to ensure that the browser 26 obtains a fresh copy of documents that it requests from the survey logic program 40, rather than pulling them from its cache memory 24. As long as the cache memory 24 perceives the source URL of a requested document to be unique from the source URL of documents that are stored in the cache memory 24, then it will fetch the document from the survey logic program 40. Intentionally defeating a cache memory is frequently referred to in the art as "cache busting."

At step 134, the survey logic program 40 executes the code in the decision module 144. The survey logic program 40 then performs the steps 136-140 according to the code in the decision module 44. During step 136, it sends a cookie to the browser 26. The cookie indicates that the user 8 has been exposed to the advertisement displayed by the ad module 38 that the browser 26 runs. Thereafter, during step 138, the survey logic program 40 compares the random number generated in step 130 to the frequency parameter. At step 139, if the random number falls outside of the numerical range represented by the frequency parameter, then the process proceeds to the End. Otherwise, control passes to step 140, wherein the survey logic program 40 sends a request for cookie data corresponding to the on-line survey to the browser 26. Specifically, the survey logic program asks whether the browser 26 has a cookie that indicates that the user was previously solicited to take the on-line survey, and whether it has a cookie indicating that the user accepted the offer to take a survey. During step 142, the browser 26 searches the cookies 23. Next, at step 143, if the browser 26 finds no cookies that correspond to the on-line survey, it sends a negative response to the survey logic program 40, and the survey logic program 40 proceeds to step 144, wherein it sends JavaScript to the browser 26 that, when executed, causes a pop-up window to appear at the computer 10, which solicits the user 8 to participate in the on-line survey. The pop-up includes a link to a web site at the survey logic server 16 that has the on-line survey. Control then proceeds to step 146, wherein the survey logic program 40 sends a cookie to the browser 26 to indicate that the user 8 has been solicited.

At step 143, if the browser 26 finds cookies corresponding to the on-line survey, then control passes to step 148 wherein it sends the data contained in the cookies to the survey logic program 40. The survey logic program then examines the cookie data. At step 149, if the cookie data indicates that user 8 actually accepted a previous attempt to take a survey, then the process passes to the End. Likewise, if, at step 151, the cookie data indicates that the amount of time elapsed since the user was last solicited to take the on-line survey is less than a time parameter T, the process passes to the End. Otherwise, the flow proceeds to step 150, wherein the survey logic program 40 sends JavaScript to the browser 26 that, when executed, causes a pop-up window to appear at the computer 10, which solicits the user 8 to participate in the on-line survey. The pop-up includes a link to a web site at the survey logic server that has the on-line survey. Control then proceeds to step 152, wherein the survey logic program 40 sends an updated timestamp to the browser 26 to indicate that the user 8 has been solicited. The browser updates the timestamp of the appropriate cookie.

At step 153, if the user does not click on the link in the pop-up window prior to the expiration of a timeout period, or if the user dismisses the popup, the process ends. Otherwise, if the user clicks on the link in the pop-up window, then control passes to step 156, wherein the browser automatically downloads a web page containing the survey from the survey logic program 40. Next, at step 158, the survey logic program 40 then sends a cookie to the browser 26 to indicate, for future reference, that the user has taken the on-line survey. The user may then take the on-line survey.

According to an optional feature of the invention, the code for calling routines in the survey logic server 16 (FIG. 2) is included in an ad module that is NOT subject of the survey in order to solicit "control" subjects. More specifically, some on-line survey campaigns conducted in accordance with the invention are designed to recruit both "exposed" subjects (those who are more likely to have been exposed to the brand that is the subject of the survey) and "control" subjects (those who are less likely to have been exposed to the brand). Exposed subjects are identified in a variety of ways. For example, exposed subjects are identified by checking a user's computer to see if its non-volatile memory has a cookie indicating that an advertisement for the brand has been shown. If a user's computer has a cookie indicating that the advertisement was displayed on the user's computer, then the user is classified as exposed, while the absence of such a cookie classifies the user as control. Also, the selection of which banner ads will have code for invoking the survey logic server 16 helps to distinguish exposed participants from control participants. For example, if the purpose of the on-line survey is to determine the impact of the FORD brand on automobile owners, then code for invoking routines on the survey logic server 16 is placed in FORD banner ads to recruit exposed participants and in some other banner ad—a 20TH CENTURY real estate company ad, for example—to recruit control participants. According to an embodiment of the invention, if the ad module that is being modified by script from the survey logic server 16 (FIG. 2) carries a brand that is the subject of the survey campaign, the pop-up window code sent from the survey logic server 16 to the computer 10 is triggered when the user leaves the page (e.g. using the JavaScript "onUnload" command) to ensure that the user 8 has the opportunity to view the banner ad. Conversely, if the banner ad carries a brand that is not the subject of the survey, then the solicitation sent from the survey logic server 16 is triggered as soon as it reaches the browser 26 (e.g. using the JavaScript "onLoad" command).

It can thus be seen that a new a useful method and system for conducting an on-line survey has been provided. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for conducting an on-line survey in association with presentation of an on-line advertisement by a browser client, the method comprising:
   receiving, by a user computer hosting the browser client, a web page configured to display an on-line advertisement;

issuing, by the user computer in association with processing the received web page, a request to an ad server, for a block of data comprising computer-readable instructions for presenting the on-line advertisement via the browser client;

sending, by the ad server in response to the issued request from the user computer, the block of data including computer-readable instructions for presenting the on-line advertisement and the block of data further including additional computer-readable instructions that facilitate decision-making steps for determining whether to present an on-line survey solicitation via the browser client, wherein acceptance of the on-line survey solicitation by the user results in presentation of an on-line survey via the browser client;

accessing, on the user computer, a timestamp value indicative of a period of time that has passed since the on-line survey solicitation was previously presented by the browser client; and executing the additional computer-readable instructions if the timestamp value indicates passage of a period of time satisfying a prescribed wait period between consecutive presentations of the on-line survey solicitation by the browser client on the user computer, wherein the decision-making steps comprise generating a random number on the user computer; and wherein the method further comprises applying a frequency parameter value to the random number to determine whether to present a survey invitation on the user computer, wherein the frequency parameter value is specified by a survey logic server, wherein the executing step comprises providing the random number to the survey logic server, wherein the survey logic server performs the applying step, and wherein the random number is appended to a URL used by a browser on the user computer to contact the survey logic server.

2. The method of claim 1, wherein the accessing step comprises receiving cookie data from the browser client indicative of a previous presentation of the on-line survey solicitation.

3. The method of claim 1, further comprising sending the block of data, including the additional computer-readable instructions, to the browser client over a computer network.

4. The method of claim 1, further comprising:
presenting the on-line survey solicitation thereby soliciting the user to take the on-line survey,
generating, in association with the presenting step, cookie data including the timestamp value to indicate that the on-line survey solicitation was presented by the browser client; and
sending the generated cookie data over a computer network to the browser client.

5. The method of claim 1, further comprising executing the additional computer-readable instructions to perform steps of:
generating a random number;
determining whether the random number falls within a set of numbers that correspond to a frequency with which the on-line survey solicitation is presented via browser clients; and
presenting the on-line survey solicitation based on the determining step.

6. The method of claim 1, further comprising:
presenting the on-line survey solicitation as a pop-up window; and
in response to activation of a link within the pop-up window, sending the on-line survey in the form of a web page to the browser client, the on-line survey comprising questions regarding a product or service advertised in the on-line advertisement.

7. The method of claim 1, further comprising:
presenting the on-line survey solicitation as a pop-up window; and
in response to activation of a link within the pop-up window, sending the on-line survey in the form of a web page to the browser client, the on-line survey comprising questions regarding a product or service that is not advertised in the on-line advertisement.

8. The method of claim 1 further comprising the step of changing the frequency parameter value during a survey campaign.

9. The method of claim 1 wherein the prescribed wait period is specified by a survey logic server.

10. A method for conducting an on-line survey in association with presentation of an on-line advertisement by a browser client, the method comprising:
receiving, by a user computer hosting the browser client, a web page configured to display an on-line advertisement;
issuing, by the user computer in association with processing the received web page, a request to an ad server, for a block of data comprising computer-readable instructions for presenting the on-line advertisement via the browser client;
sending, by the ad server in response to the issued request from the user computer, the block of data including computer-readable instructions for presenting the on-line advertisement and the block of data further including additional computer-readable instructions that facilitate decision-making steps for determining whether to present an on-line survey solicitation via the browser client, wherein acceptance of the on-line survey solicitation by the user results in presentation of an on-line survey via the browser client;
accessing, on the user computer, a timestamp value indicative of a period of time that has passed since the on-line survey solicitation was previously presented by the browser client; and
executing the additional computer-readable instructions if the timestamp value indicates passage of a period of time satisfying a prescribed wait period between consecutive presentations of the on-line survey solicitation by the browser client on the user computer;
wherein the executing the additional computer-readable instructions facilitates performing the steps of:
referencing a frequency parameter that influences the frequency of presenting the on-line survey solicitations; and
determining whether or not to present the on-line survey solicitation via the browser client based, in part, on the frequency parameter;
wherein the on-line survey solicitation is presented as part of a campaign, wherein the frequency parameter has a value that is at least partially a function of an amount of time remaining in the campaign, the method further comprising calculating the value of the frequency parameter according to an algorithm that incorporates the amount of time remaining in the campaign.

11. A method for conducting an on-line survey in association with presentation of an on-line advertisement by a browser client, the method comprising:
  receiving, by a user computer hosting the browser client, a web page configured to display an on-line advertisement;
  issuing, by the user computer in association with processing the received web page, a request to an ad server, for a block of data comprising computer-readable instructions for presenting the on-line advertisement via the browser client;
  sending, by the ad server in response to the issued request from the user computer, the block of data including computer-readable instructions for presenting the on-line advertisement and the block of data further including additional computer-readable instructions that facilitate decision-making steps for determining whether to present an on-line survey solicitation via the browser client, wherein acceptance of the on-line survey solicitation by the user results in presentation of an on-line survey via the browser client;
  accessing, on the user computer, a timestamp value indicative of a period of time that has passed since the on-line survey solicitation was previously presented by the browser client; and
  executing the additional computer-readable instructions if the timestamp value indicates passage of a period of time satisfying a prescribed wait period between consecutive presentations of the on-line survey solicitation by the browser client on the user computer;
  wherein the executing the additional computer-readable instructions facilitates performing the steps of:
    referencing a frequency parameter that influences the frequency of presenting the on-line survey solicitations; and
    determining whether or not to present the on-line survey solicitation via the browser client based, in part, on the frequency parameter;
  wherein the on-line survey solicitation is presented as part of a campaign, wherein the frequency parameter has a value that is at least partially a function of an amount of time remaining in the campaign, the method further comprising determining the value of the frequency parameter by referencing a look-up table that correlates a plurality of possible times remaining in the campaign with corresponding possible frequency values.

12. A system for conducting an on-line survey, the system comprising:
  a client computer for interacting with a user;
  a web server in communication with the client computer;
  an advertisement server;
  a survey logic server in communication with the client computer; and
  computer-readable instructions for:
    requesting a web page to be sent from the web server to the client computer, the web page including a reference to an on-line advertisement to be presented on the client computer;
    requesting, by the client computer the on-line advertisement from the advertisement server for presentation on the client computer; and
    sending an on-fine survey solicitation associated with the on-line advertisement from the survey logic server to the client computer based at least in part on a stored timestamp value on the client computer indicative of a period of time that has passed since a previous presentation of the on-line survey solicitation on the client computer, wherein acceptance of the on-line survey solicitation by the user results in presentation of an on-line survey on the client computer,
  wherein the sending step comprises invoking a routine at the survey logic server that compares a random number to a set of values based on a frequency parameter to determine whether to send the on-line survey solicitation to the client computer, and
  wherein the on-line survey solicitation is presented as part of a campaign, and wherein a value of the frequency parameter is at least partially a function of elapsed time in the campaign.

13. The system of claim 12, wherein the frequency parameter is determined according to an algorithm.

14. The system of claim 12, wherein the frequency parameter is determined by referencing a look-up table.

15. The system of claim 12, wherein the advertisement server adds first computer-readable instructions, for invoking a decision routine, to the advertisement data when consideration is to be given to sending the on-line survey solicitation to the computer.

16. The system of claim 15, wherein the survey logic server provides the first computer readable instructions to the ad server.

* * * * *